United States Patent [19]

Kamo

[11] Patent Number: 5,820,976
[45] Date of Patent: Oct. 13, 1998

[54] THIN INSULATIVE CERAMIC COATING AND PROCESS

[75] Inventor: Lloyd Kamo, Columbus, Ind.

[73] Assignee: Adiabatics, Inc., Columbus, Ind.

[21] Appl. No.: 279,713

[22] Filed: Dec. 5, 1988

[51] Int. Cl.$^6$ .................... B32B 3/26; B05D 3/08
[52] U.S. Cl. .................... 428/312.8; 427/226; 427/9; 427/320; 427/419.2; 427/419.3; 428/313.7; 428/313.9; 428/314.3; 428/314.4; 429/697
[58] Field of Search ............... 427/226, 380, 427/239, 419.2, 419.3; 428/314.4, 312.8, 313.9, 313.7, 697, 314.2

[56] References Cited

U.S. PATENT DOCUMENTS

| | | |
|---|---|---|
| 3,734,767 | 5/1973 | Church et al. . |
| 3,789,096 | 1/1974 | Church et al. ............... 264/60 |
| 3,817,781 | 6/1974 | Church et al. . |
| 3,925,575 | 12/1975 | Church et al. ............... 427/226 |
| 3,944,683 | 3/1976 | Church et al. ............... 427/34 |
| 3,956,531 | 5/1976 | Church et al. ............... 427/226 |
| 4,007,020 | 2/1977 | Church et al. ............... 51/295 |
| 4,615,913 | 10/1986 | Jones et al. ............... 427/226 |
| 4,744,831 | 5/1988 | Beck ............... 428/402 |

*Primary Examiner*—Janyce Bell
*Attorney, Agent, or Firm*—Ice Miller Donadio & Ryan; Paul B. Overhauser

[57] ABSTRACT

Composition and method providing a chromium oxide densified insulative coating for a substrate comprising an insulative coating comprised of refractory oxide bubbles with a melting point above that of glass bubbles, a refractory oxide and a solution of a binder capable of being converted to an oxide upon being heated, thereby effecting a bond between the refractory oxide and the substrate. The coating is thin and provides increased thermal barrier characteristics.

37 Claims, No Drawings

THIN INSULATIVE CERAMIC COATING AND PROCESS

FIELD OF THE INVENTION

This invention relates to ceramic coatings, and in particular, to ceramic coatings having insulative characteristics.

BACKGROUND OF THE INVENTION

It is often necessary to provide a ceramic coating with high thermal barrier (insulative) properties. This may be done by employing an insulative refractory oxide, such as zirconium oxide, in the coating. However, even when such a material is employed, a relatively thick coating (approximately 0.1 inch; see U.S. Pat. No. 4,615,913 Table IV, column 13–14) is necessary to provide insulative properties (thermal conductivity less than or equal to 3.5 w/m° C.)

It is well known that air has high thermal insulative properties, and several methods have been used to include air in a ceramic coating. Air may be included by adding burn-out materials, such as hollow glass beads or polystyrene particles, to the coating before densification (U.S. Pat. No. 4,615,913 column 6, lines 49–51). Densification temperatures melt or sublime the burn-out materials, leaving pockets of air trapped in the coating. This procedure can result in some channeling of air pockets, creating weak spots within the ceramic coating. Such coatings are unable to withstand the intense heat (1,000° F. or higher) of practical applications, as in internal combustion engines, because heat causes the air to expand and crack the coating.

Adding liquids with a high air content, such as whipped egg whites, to ceramic slurries has also been tried to incorporate air in the coating. However, such coatings have stratified layers of air within the resulting ceramic coating. Such coatings are weak and deteriorate in practical applications, as in internal combustion engines.

The present invention solves the shortcomings of the above thermal insulative coatings. The present invention employs refractory bubbles that are thermally stable (the refractory material does not melt or sublime) under coating densification conditions and under practical applications. These discrete bubbles prevent channeling of air pockets, and also provide a substructure (the bubble refractory material) within the coating to contain the air, which tends to expand when heated. Containing the heated air inside the bubble prevents cracking of the coating due to air expansion. Thus, the present invention now makes possible the production of an economical, thin, durable ceramic coating with a thermal conductivity of less than or equal to 3.5 W/m° C.

In the preferred embodiment of the invention, the ceramic coating is densified by including chromic acid in the slurry used to make the ceramic coating, and by later applying chromic acid to the ceramic surface and heating the ceramic. A wide variety of refractory materials may be used to form the ceramic coatings, such as: nitrides, carbides, silicides, borides, intermetallics, stannates, zirconates, titanates, borocarbides, silicates, ferrites, metals, metal alloys, oxides, complex oxides and mixtures thereof (U.S. Pat. No. 4,615,913 column 17, lines 62–67, claim 5; and U.S. Pat. No. 3,956,531 column 47, lines 11–19, claim 19, which does not list borocarbides, however, boron carbide is listed in column 47, line 37, claim 20). Specific refractory oxides that may be used are oxides of aluminum, barium, beryllium, calcium, chromium, cobalt, copper, gallium, hafnium, iron, lanthanum, magnesium, manganese, molybdenum, nickel, niobium, silicon, tantalum, thorium, tin, titanium, tungsten, uranium, vanadium, yttrium, zinc, zirconium, and mixtures thereof (U.S. Pat. No. 4,007,020 column 123, lines 33–40, claim 2; U.S. Pat. No. 3,944,683 column 124, lines 48–55, claim 2; U.S. Pat. No. 3,925,575 column 125, lines 45–52, claim 7; and U.S. Pat. No. 3,789,096 column 151, lines 10–17, claim 2), and cadmium, lithium, and strontium (U.S. Pat. No. 3,817,781 column 43, lines 48–49, claim 4). Metal particles from a group consisting of stainless steel, molybdenum, titanium, aluminum, iron, nickel, chromium, tungsten, and copper may also be used as refractory materials (U.S. Pat. No. 3,944,683 column 126, lines 29–32, claim 25).

Also, a wide variety of binders may be included in the ceramic slurry and/or densification coatings, such as: soluble chromium compounds (including chromic acid (U.S. Pat. No. 4,615,913 column 17, lines 47–48, claim 3; U.S. Pat. No. 3,789,096, column 152, lines 4–5, claim 11), a solution of a chromium compound wherein the chromium compound is chromic acid reduced by a reducing agent selected from the group consisting of a tartaric acid, carbon, and formic acid (U.S. Pat. No. 3,956,531 column 44, lines 13–34, claim 5), and magnesium chromate (U.S. Pat. No. 3,734,767 column 44, lines 5–6, claim 3)), phosphoric acid (U.S. Pat. No. 3,944,683 column 124, lines 58–63, claim 4; U.S. Pat. No. No. 3,817,781 column 43, (lines 61–73) and column 44 (lines 1–4), claim 10), sodium silicate (U.S. Pat. No. 4,615,913 column 18, lines 5–8, claim 6), a solution of a soluble compound of a metal selected from the group consisting of aluminum, beryllium, silicon, tin, and zirconium (U.S. Pat. No. 3,925,575 column 125, lines 12–32, claim 1).

However, none of the above patents discloses the inclusion of thermally stable refractory bubbles in the ceramic coating.

OBJECTS OF THE INVENTION

One object of the invention is to provide a ceramic coating having high thermal barrier characteristics, even for thin coatings.

Another object of the invention is to provide a ceramic coating which may be densified using chromium oxide.

Another object of the invention is to provide a ceramic coating which is durable and not subject to chipping or cracking due to thermal cycling.

Another object of the invention is to provide a ceramic coating of low cost.

Another object of the invention is to provide a ceramic coating which need not be applied by thermal spraying or other conventional means of application.

Still other objects and advantages of the invention will become apparent to those of skill in the art after reading the following description of a preferred embodiment.

SUMMARY OF THE INVENTION

A composition and process are provided for producing a thin, durable, insulative ceramic coating on a metal, metal oxide, ceramic, or other suitable substrate. The coating compromises a refractory oxide in combination with refractory oxide bubbles that have a melting point above that of glass bubbles and a binder which, upon heating, effects a bond between the coating and substrate. Such coatings are advantageous in high temperature services, such as combustion chamber surfaces and components of internal combustion engines.

DETAILED DESCRIPTION OF THE PRESENT INVENTION

An insulative coating of the present invention may be made on a substrate, for example, by performing the following steps:

Optional Step 1

Application of a Base Coat

To improve bonding between the substrate and the coating, it is possible to apply a base coat to the substrate prior to the application of the insulative coat as described below. The bond coat may consist of the same ingredients in the insulative coating slurry composition described below, except that the refractory oxide bubbles should be eliminated. An example of the resulting base coat would be 60% silicon dioxide, 20% zirconium dioxide, and 20% chromium (III) oxide. A solution of 2 parts saturated aqueous chromic acid solution and one part water is then added to these solid ingredients until a slurry having a density (similar to thick paint) of 1.85 gm/ml to 2.25 gm/ml is formed. The resulting base coat may be applied directly to the substrate using any of the methods available for application of the insulative coating as described below, and may be applied to the thickness of about 0.0002–0.005 in. After application of the base coat, the combination is heated to 950° F. at an average rate of about 10° F./min. and cooled to room temperature at the same rate.

Step 2

Application of Insulative Coating

A slurry is created by first mixing refractory oxide particles with refractory oxide bubbles. The mixture may also include chromium oxide particles. A typical combination is disclosed in the following table:

| Ingredient | Percentage (by weight) | Optimum Percent | Approx. Particle Size |
| --- | --- | --- | --- |
| Silicon dioxide | 50–60 | 50 | 10 micron |
| Zirconium dioxide | 30–15 | 30 | 35–40 micron |
| Volcanic ash bubbles (approx. 80% $SiO_2$; 20% $Al_2O_3$) | 10–20 | 10 | 10–90 micron |
| Chromium (III) oxide ($Cr_2O_3$) | 10–5 | 10 | 10–30 micron |

To these ingredients is added a liquid mixture consisting of approximately 2 parts saturated aqueous chromic acid solution and approximately one part water. This liquid is mixed with the solid ingredients until a slurry having a density (similar to thick paint) of about 1.95 gm/ml (Range= 1.85 gm/ml–2.25 gm/ml) is formed.

Before the slurry has a chance to settle, it is applied to the substrate (a metal, metal oxide, ceramic, or other suitable surface, for example, a combustion chamber surface of an internal combustion engine). Such application may be made by spraying the slurry with a commercial spray gun, having a stainless steel tip, onto the substrate, by dipping the substrate into the slurry, or by applying the slurry to the substrate with a spatula or brush. In the preferred embodiment, a coating between about 0.030–0.040 inch (0.076–0.102 cm.) thickness is applied (the upper limit will be about 0.060 in.).

After the slurry has been applied to the substrate, the substrate/insulative coat combination is then heated in an oven to drive off the water in the slurry. This is done by heating the coated substrate from room temperature to about 350° F. (177° C.) at a rate of about 3° F./min. This slow initial heat rate is necessary in order to vaporize the water and at the same time prevent boiling of the water in the slurry (boiling water trapped in the pores of the coating will crack the coating). After a temperature of about 350° F. has been reached, the rate may be increased to about 10° F./minute. When the temperature reaches about 950° F., the temperature may be reduced to room temperature at an average rate of about 10° F./minute. The insulative coating may be made thicker by repeating the above application process, or may be made thinner by milling the coating down to the desired thickness after the slurry has dried.

The slurry is heated to 950° F. in order to convert chromic acid to chromium (III) oxide. This procedure hardens the coating and bonds it to the substrate. Heating the slurry to 850° F. will also convert the chromic acid to chromium (III) oxide, but the rate of conversion is slow. The slurry may also be heated to a temperature above 950° F. but below the vitrification temperature of the refractory materials with no adverse effects.

When the temperature is increased from 350° F. to 950° F., and then cooled to room temperature, the average rate of increase or decrease may range from about 3° F./min. to about 15° F./min. However, an average rate of 3° F./min. is too slow a rate to be practical. Also, decreasing the temperature at an average rate of 15° /min. would require deviating from the method of opening the oven door and allowing the temperature inside the oven to equilibrate to room temperature (a method which cools the coating at an average rate of about 10° F./min.).

Decreasing particle size below the range shown above will result in a coating that is too thin to have good thermal insulative properties. Increasing particle size above the range shown above will result in a coating that is too thick, not durable, and weakly bonded to the substrate.

Also, increasing the percentage of silicon dioxide and chromium (III) oxide in the slurry will increase the overall strength of the coating but will decrease the coating's thermal barrier characteristics.

Step 3

Initial Densification of the Insulative Coating

The resulting insulative coating may then be "chromium oxide densified" (a process that fills in the open pores of the ceramic coating, hardens the coating, and strongly bonds the coating to the substrate) using any of the chromium oxide densification processes described in the above referenced patents or the following preferred densification process.

Chromic acid (saturated aqueous solution) is applied to the coating and allowed to soak into the coating and down to the substrate. The coating and substrate are then heated in an oven to about 950° F. at an average rate of about 10° F./minute, then cooled to room temperature at an average rate of about 10° F./minute. The chromic acid application and heating process is then repeated, preferably at least four more times.

Optional Step 4

Finish Coat

Since the densified insulative coat may have a rough surface, it may be desirable to apply an optional finish coat. An optional finish coat may be added by applying the same base coat slurry described above to the insulative coat. The maximum thickness of the finish coat is usually 0.005 in. After the finish coat is heated and cooled, it may be sanded or milled to a thickness of about 0.001 in. The initial chromium oxide densification process of step 3 is then repeated.

Step 5

Final Densification of Insulative Coating

A solution comprising about one part saturated aqueous chromic acid and about one part formic acid solution (technical grade) (the proportion can vary to about one part saturated aqueous chromic acid solution to about two parts formic acid solution) is then applied to the insulative coating, allowed to soak into the coating, and heated to about 600° F. at an average rate of about 10° F./minute, and cooled to room temperature at the same rate. This step is preferably repeated at least one additional time.

A solution comprising two parts 85% aqueous monoaluminum phosphate (aluminum orthophosphate) to one part of the chromic-formic acid solution above is then applied to the insulative coating. This process assists in filling in the open pores on the surface of the coating. It is preferable to carefully wipe off any excess amounts of this compound after application. The coating is then fired to 650° F. at an average rate of about 10° F./minute, then cooled to room temperature at the same rate. This step is then repeated at least one and no more than three additional times (repeating this step more than three times will cause an undesirable thickening of the coating). This procedure forms extremely strong interconnecting bonds within the upper 0.004 in. surface of the coating. The densification temperatures shown above may vary from a temperature necessary to convert chromic acid to $Cr_2O_3$ to a temperature below the vitrification temperature of the refractory materials. Also, the average rate of increase and decrease of the temperature may vary as in Step 2 above with the average rate of about 10° F./min. being preferred for the same reasons as in Step 2.

The insulative coating of the present invention is particularly suited for application to combustion chamber defining surfaces of an internal combustion engine, such as cylinder head combustion face, cylinder walls, piston caps, and valve faces. The insulative coating may also be used for coating casting molds and for coating exhaust intake manifolds.

Various ingredient substitutions may be made to the insulative slurry described above. However, the refractory oxide bubbles, made from a refractory oxide, that has a melting point exceeding that of hollow glass beads (about 1,400° F.) (for example, the volcanic ash bubbles above), must be included in the slurry to maintain the insulative characteristic of the present invention. Various refractory oxides, such as oxides of aluminum, titanium, cerium, iron and yttrium may be substituted for silicon dioxide and zirconium dioxide and are identified in the above referenced patents.

It is preferable to use a soluble chromium binder, but other binders such as appropriate amounts of potassium silicate, sodium silicate, phosphoric acid and the like can be used.

The volcanic ash bubbles (silace balloons) contemplated for use in the present invention comprise hollow spheres of approximately 80% silicon dioxide, 20% aluminum oxide, have a melting point of approximately 2300° F., and are commercially available from Ijichi Kasei Industry (distributed by Izumi Kyogo Co., Ltd., 620 Oonakai Kawagoe-shi, Saitama, Japan). The monoaluminum phosphate used in the above described chromium oxide densification process is also commercially available from several sources, including Merck of West Germany.

Many changes could be made in the above process and many different embodiments of this invention could be made without departing from the scope thereof, and it is intended that all matter contained in the above description shall be interpreted as illustrative and not in a limiting sense.

I claim:

1. An article comprising a substrate and a chromium oxide densified insulative ceramic coating upon the surface of the substrate, the coating comprising:

refractory oxide bubbles with a melting point above that of glass bubbles, a refractory oxide and a water insoluble oxide effecting a bond between the refractory oxide and said substrate.

2. The coating of claim 1, further comprising:

a bond coating disposed between said substrate and said insulative coating comprised of a refractory oxide and a binder that is converted to a water insoluble oxide upon being heated, thereby effecting a bond between the refractory oxide and said substrate.

3. The coating of claim 1, further comprising:

a finish coating on said insulative coating comprised of a refractory oxide and a binder that is converted to a water insoluble oxide upon being heated, thereby effecting a bond among the refractory oxide particles.

4. The coating of claims 1, 2, or 3, wherein the refractory oxide includes zirconium dioxide.

5. The article of claims 1, 2, or 3, wherein the refractory oxide bubbles are volcanic ash bubbles having a composition of approximately 80% silicon dioxide and 20% aluminum oxide and a melting point of approximately 2300° F.

6. The coating of claims 1, 2, or 3, wherein the particle sizes of said refractory oxide are from about 10–40 microns in diameter.

7. The coating of claims 1, 2, or 3, wherein said refractory oxide bubbles are from 10–90 microns in diameter.

8. The coating of claims 1, 2, or 3, wherein said substrate comprises a combustion chamber surface of an internal combustion engine.

9. The coating of claim 1, wherein said coating thickness is between about 0.030–0.060 in.

10. The coating of claim 1, wherein said coating thickness is between about 0.030–0.040 in.

11. The coating of claim 1, 2 or 3, wherein said refractory oxide bubbles have a melting point above 1500° F.

12. An article comprising a substrate and an improved chromium oxide densified coating upon the surface of the substrate, the coating comprising a refractory oxide and a water insoluble oxide effecting a bond between the refractory oxide and a substrate, the improvement comprising:

inclusion of refractory oxide bubbles with a melting point above that of glass bubbles disposed within said coating.

13. The coating of claim 12, wherein said coating thickness is between about 0.030–0.060 inch.

14. The coating of claim 12, wherein said coating thickness is between about 0.030–0.040 inch.

15. The article of claim 12, wherein said refractory oxide bubbles are volcanic ash bubbles having a composition of approximately 80% silicon dioxide and 20% aluminum oxide and a melting point of approximately 2300° F.

16. An article comprising a substrate and a chromium oxide densified insulative ceramic coating upon the surface of the substrate, the coating comprising:

(a) a bond coating comprised of a refractory oxide and a water insoluble oxide effecting a bond between the refractory oxide and said substrate;

(b) an intermediate coating comprised of refractory oxide bubbles with a melting point above that of glass bubbles, a refractory oxide and a water insoluble oxide effecting a bond between the refractory oxide and said bond coating; and (c) a finish coating on said intermediate coating comprised of a refractory oxide and a water insoluble oxide effecting a bond between the refractory oxide and said intermediate coating.

17. A method for producing an insulative coating on a substrate comprising:
   (a) applying to said substrate an insulative slurry layer, said slurry layer being comprised of (1) a refractory oxide, (2) refractory oxide bubbles with a melting point above that of glass bubbles, and (3) a solution of a binder that is converted to a water insoluble oxide upon being heated;
   (b) thermally drying and curing said slurry layer by heating same to a temperature below the vitrification temperature of said refractory oxide and refractory oxide bubbles, but sufficient to convert the binder to a water insoluble oxide to harden said slurry layer and bind it to said substrate;
   (c) impregnating said dried and cured slurry layer with a solution containing a chromium compound that is converted to a water insoluble oxide upon being heated;
   (d) heating said impregnated layer of (c) to a temperature below the vitrification temperature of said refractory oxide and refractory oxide bubbles, but sufficient to convert said binder to a water insoluble oxide to harden and densify said coating.

18. The method of claim 17, further comprising, prior to applying said slurry layer to the substrate:
   (a) applying to said substrate a bond layer of a slurry, said slurry being comprised of (1) a refractory oxide and (2) a solution of a binder that is converted to a water insoluble oxide upon being heated; and
   (b) drying and curing said bond layer slurry by heating same to a temperature below the vitrification temperature of said refractory oxide and refractory oxide bubbles, but sufficient to convert said binder to a water insoluble oxide to harden said bond layer and bind it to said substrate.

19. The method of claim 17, further comprising, after step (d):
   (a) applying to said insulative coating a finish layer of a slurry, said slurry being comprised of (1) a refractory oxide and (2) a solution of a binder that is converted to a water insoluble oxide upon being heated; and
   (b) drying and curing said finish layer slurry by heating same to a temperature below the vitrification temperature of said refractory oxide and refractory oxide bubbles, but sufficient to convert said binder to a water insoluble oxide to harden and densify said coating.

20. The method of claim 17, further comprising:
   repeating steps (c) and (d) until a desired densification level is obtained.

21. The method of claims 17, 18, 19 or 20, wherein said refractory oxide comprises zirconium oxide.

22. The method of claims 17, 18, 19 or 20, wherein said refractory oxide bubbles are made of volcanic ash having a composition of approximately 80% silicon dioxide and 20% aluminum oxide and a melting point of approximately 2300° F.

23. The method of claims 17, 18, 19 or 20, wherein the particle sizes of said refractory oxide are from about 10–40 microns in diameter.

24. The method of claims 17, 18, 19 or 20, wherein said refractory oxide bubbles are from 10–90 microns in diameter.

25. The method of claims 17, 18, 19 or 20, wherein said substrate comprises a combustion chamber surface of an internal combustion engine.

26. The method of claims 17 or 20, wherein said coating thickness is between about 0.030–0.060 inch.

27. The method of claims 17 or 20, wherein said coating thickness is between about 0.030–0.040 inch.

28. The method of claims, 17, 18, 19 or 20, wherein said refractory oxide bubbles have a melting point above 1500° F.

29. An improved method for producing a chromium oxide densified coating comprising the steps of:
   (a) applying to a substrate a layer of a slurry, said slurry being comprised of (1) a refractory oxide, (2) refractory oxide bubbles with a melting point above that of glass bubbles, and (3) a solution of a binder that is converted to a water insoluble oxide upon being heated;
   (b) drying and curing said slurry layer by heating same to a temperature below the vitrification temperature of said refractory oxide and refractory oxide bubbles, but sufficient to convert said binder to a water insoluble oxide to harden said coating and bind it to said substrate;
   (c) impregnating said dried and cured slurry layer with a solution containing an effective amount of a chromium compound that is converted to a water insoluble oxide upon being heated;
   (d) heating said impregnated slurry layer of (c) to a temperature below the vitrification temperature of said refractory oxide and refractory oxide bubbles, but sufficient to convert said binder to a water insoluble oxide to harden and densify said coating;
   the improvement comprising:
      including refractory oxide bubbles with a melting point above that of glass bubbles in said slurry.

30. The method of claim 29, further comprising:
   repeating steps (c) and (d) until a desired densification level is obtained.

31. The method of claims 29 or 30, wherein said coating thickness is between about 0.030–0.060 inch.

32. The method of claims 29 or 30, wherein said coating thickness is between about 0.030–0.040 inch.

33. The method of claim 29, further comprising, prior to applying said insulative coating:
   (a) applying to said substrate a bond layer of a slurry, said slurry being comprised of (1) a refractory oxide and (2) a solution of a binder that is converted to a water insoluble oxide upon being heated; and
   (b) drying and curing said bond layer slurry by heating same to a temperature below the vitrification temperature of said refractory oxide, but sufficient to convert said binder to a water insoluble oxide to harden said bond layer and bind it to said substrate.

34. The method of claim 33, further comprising, after applying said insulative coating:
   (a) applying to said insulative coat a finish layer of a slurry, said slurry being comprised of (1) a refractory oxide and (2) a solution of a binder that is converted to a water insoluble oxid upon being heated; and
   (b) drying and curing said finish layer slurry by heating same to a temperature below the vitrification temperature of said refractory oxide and refractory oxide bubbles, but sufficient to convert said binder to a water insoluble oxide to harden and densify said coating.

35. The method of claims 29, 33 or 34, wherein said refractory oxide bubbles are made of volcanic ash having a composition of approximately 80% silicon dioxide and 20% aluminum oxide and a melting point of approximately 2300° F.

36. The method of claims 29, 33 or 34, wherein said substrate comprises a combustion chamber surface of an internal combustion engine.

37. A method for producing an insulative coating on a substrate comprising:
  (a) applying to said substrate a bond layer of a slurry, said slurry being comprised of (1) a refractory oxide and (2) a solution of a binder that is converted to a water insoluble oxide upon being heated;
  (b) drying and curing said bond layer slurry of (a) by heating same to a temperature below the vitrification temperature of said refractory oxide, but sufficient to convert said binder to a water insoluble oxide to harden said bond layer and bind it to said substrate;
  (c) applying to said dried and cured bond layer of (b) an insulative slurry layer, said insulative slurry layer being comprised of (1) a refractory oxide, (2) refractory oxide bubbles with a melting point above that of glass bubbles, and (3) a solution of a binder that is converted to a water insoluble oxide upon being heated;
  (d) thermally drying and curing said insulative slurry layer of (c) by heating same to a temperature below the vitrification temperature of said refractory oxide and refractory oxide bubbles, but sufficient to convert said binder to a water insoluble oxide to harden said insulative slurry layer and bind it to said dried and cured bond layer of (b);
  (e) impregnating said dried and cured insulative slurry layer of (d) with a solution containing a chromium compound that is converted to a water insoluble oxide upon being heated;
  (f) heating and curing said impregnated layer of (e) to a temperature below the vitrification temperature of said refractory oxide and refractory oxide bubbles, but sufficient to convert said binder to a water insoluble oxide to harden and densify said insulative slurry layer;
  (g) applying to said heated and cured insulative slurry layer of (f) a finish layer of a slurry, said finish layer slurry being comprised of (1) a refractory oxide and (2) a solution of a binder that is converted to a water insoluble oxide upon being heated; and
  (h) drying and curing said finish layer slurry of (g) by heating same to a temperature below the vitrification temperature of said refractory oxide and refractory oxide bubbles, but sufficient to convert said binder to a water insoluble oxide to harden and densify said coating.

* * * * *